United States Patent [19]
Koch

[11] Patent Number: 5,083,899
[45] Date of Patent: Jan. 28, 1992

[54] ENERGY MACHINE

[75] Inventor: Gerald W. Koch, Williamsville, N.Y.

[73] Assignee: Geph Enterprises, Inc., Lockport, N.Y.

[21] Appl. No.: 508,211

[22] Filed: Apr. 12, 1990

[51] Int. Cl.⁵ .................. F03D 3/04; F03D 11/00
[52] U.S. Cl. .................. 415/2.1; 415/4.2; 416/145
[58] Field of Search ............ 415/2.1, 3.1, 4.1, 4.2, 415/4.4, 121.2, 182.1, 183, 208.1, 905, 907; 416/55, 144, 145; 290/54, 55

[56] References Cited

U.S. PATENT DOCUMENTS

| | | | |
|---|---|---|---|
| 377,602 | 2/1888 | Cooper | 415/2.1 |
| 1,263,983 | 4/1918 | Winne | 415/905 |
| 1,315,595 | 9/1919 | Clark | 415/4.4 |
| 2,037,857 | 4/1936 | Fox | 415/121.2 |
| 3,048,006 | 8/1962 | Goodman | 415/208.1 |
| 3,938,907 | 2/1976 | Magoveny et al. | 415/907 |
| 4,057,270 | 11/1977 | Lebost | 415/4.4 |
| 4,096,698 | 6/1978 | Martin | 415/905 |
| 4,191,505 | 3/1980 | Kaufman | 415/2.1 |
| 4,350,900 | 9/1982 | Baughman | 290/55 |

FOREIGN PATENT DOCUMENTS

| | | | |
|---|---|---|---|
| 59852 | 8/1954 | France | 415/2.1 |
| 2472093 | 6/1981 | France | 415/3.1 |
| 1251 | 1/1977 | Japan | 415/2.1 |
| 3500 | 1/1985 | Japan | 415/208.1 |

Primary Examiner—Edward K. Look
Assistant Examiner—James A. Larson
Attorney, Agent, or Firm—James F. Mudd; Michael L. Dunn; Ellen K. Park

[57] ABSTRACT

A fluid driven turbine motor having a turbine shroud and a rotor assembly attached to a central portion within the turbine shroud. The rotor assembly includes a rotor and a plurality of vertical vanes mounted thereto and extending radially outward therefrom. The turbine shroud also includes a plurality of intake ports directing a fluid flow to the vanes. The intake ports are positioned such that the fluid flow directed by the intake ports exert balanced forces onto the vanes. The motor may optionally include a retractable centrifugal weight assembly and ports for draining moisture from the rotor assembly.

9 Claims, 3 Drawing Sheets 5,083,899

ENERGY MACHINE

BACKGROUND OF THE INVENTION

Energy and environmental concerns have led to increased efforts to find effective alternative energy sources to meet current and future demands. A major focus has been on energy generated by wind. U.S. Pat. No. 4,350,900 to Baughman is an example of a machine which attempts to utilize wind energy as a power source. The Baughman patent discloses a rotary machine having a rather complex arrangement of vanes and louvers. The vanes and louvers direct air to the front half section of the rotary machine.

SUMMARY OF THE INVENTION

The invention comprises a fluid driven turbine motor comprising a turbine shroud having top, bottom, and side walls; a rotor assembly attached to a central portion within said turbine shroud; said rotor assembly comprising a rotor and a plurality of vertical vanes; said vanes being mounted to said rotor and extending radially outward therefrom; and a plurality of intake ports directing a fluid flow to said vanes; said intake ports being positioned such that fluid flow directed thereby exerts balanced forces onto said vanes.

It is the object of the Energy Machine to utilize nonelectrical energy, produced by the flow of fluids including for example, ram air, atmospheric wind, a combination of both or liquid flow, for example, to generate electrical energy for a variety of uses.

BRIEF DESCRIPTION OF THE DRAWINGS

For a further understanding of the invention as well as the characterizing features of the preferred embodiment, reference should now be made to the following detailed description of that preferred embodiment taken in conjunction with the accompanying drawings, wherein.

DETAILED DESCRIPTION OF THE INVENTION

Figure 2:
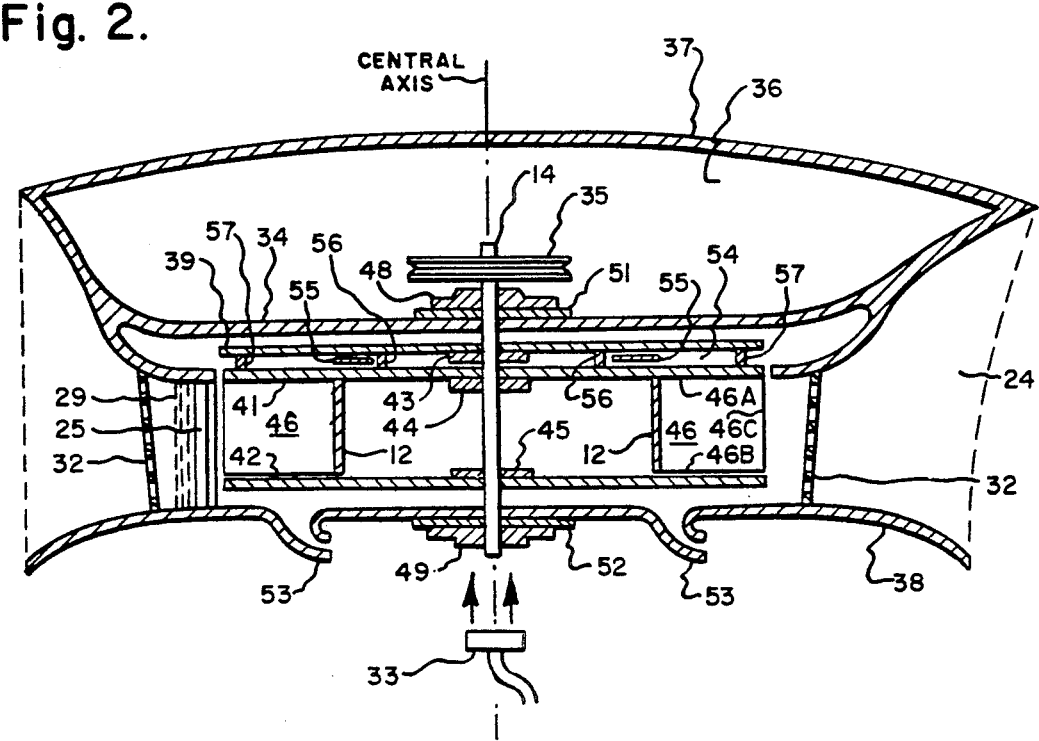
FIG. 2 is a left elevation sectional view vertical section on the line 2—2' of FIG. 1 and in the direction of the arrows.

The fluid driven turbine motor comprises a motor shroud assembly 10 which is the entire covering of the rotor assembly 11. The shroud is designed so as to maximize efficiency of applying pressure to the rotor vanes 13 to initiate and maintain optimum movement of the rotor 12 in a predetermined direction. The rotor assembly comprises the rotor 12, and a plurality of vanes 13. The rotor vanes are carried vertically on and around the rotor 12 to extend radially outward therefrom and are spaced from one another in a predetermined manner to maximize the efficiency of the motor. Generally, the vanes may be between 1 to 3 inches apart, along the circumference of the rotor 12, depending on the size of the motor. As shown in FIG. 2, the top edges 46A and bottom edges 46B of the vanes are fixed to the upper and lower circular disks 41 and 42, respectively. The outer edges 46C of the vanes should be in close proximity to the inner walls 15 and 19 of the motor shroud 10 to substantially prevent passage of fluid flow around said vanes and maximize the amount of fluid flow that impinges on the vanes. The vanes may generally be of any shape and size to maximize the use of the forces from the fluid flow in the desired direction of rotation for the desired motor size. The overall size of the motor would of course be in part determined by a motive power machine, for example an automobile as described in more detail hereinafter, with which it may be used.

The term front as used herein is that portion of the turbine against which fluid flow generally occurs, and the term rear is that portion of the turbine opposite to the front. The terms front and rear as related to the motor are to coincide with the same relative position existing between the motor and a motive power machine to which it may be affixed.

Figure 1:
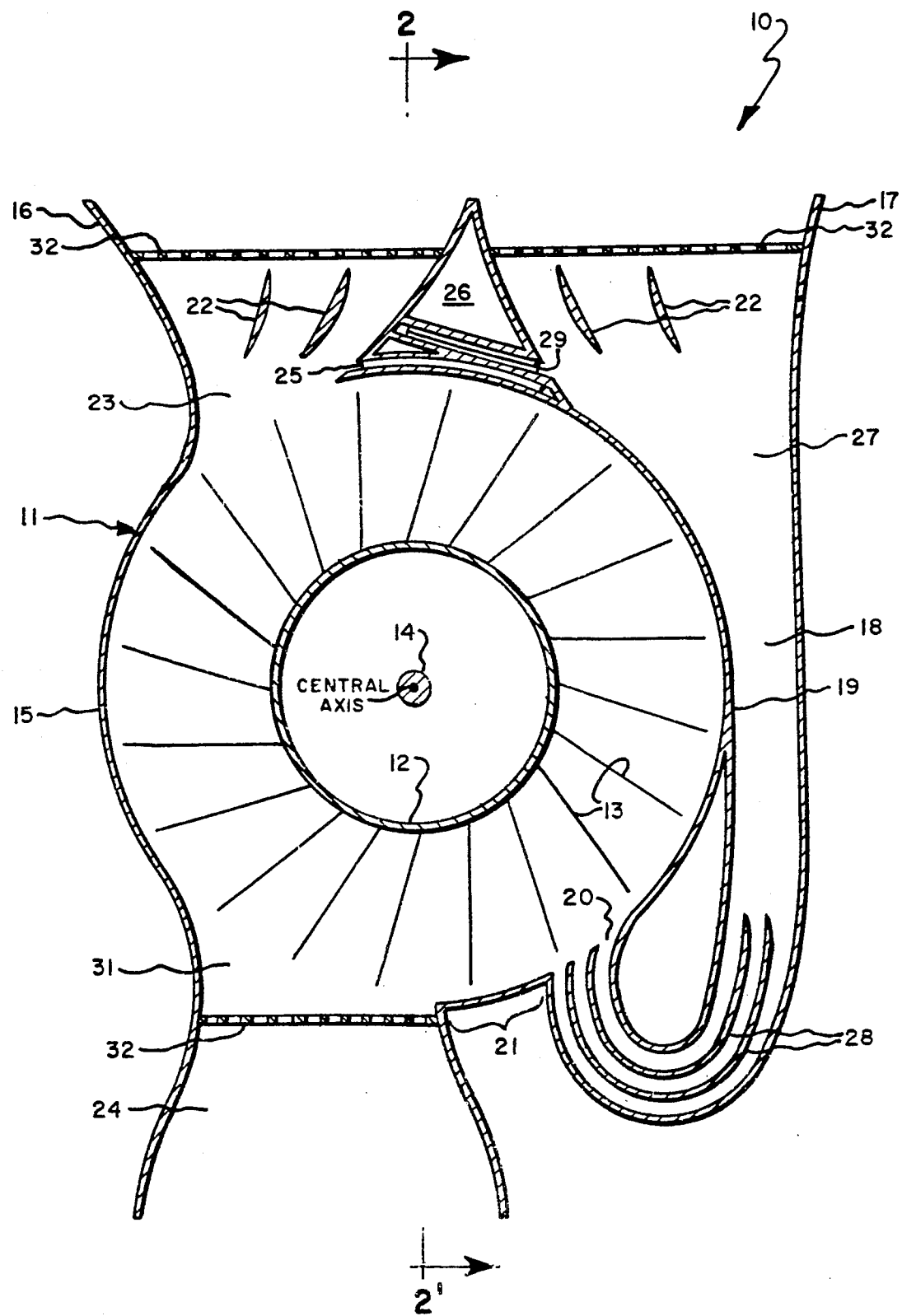
FIG. 1 is a plan sectional view of the apparatus.

For purposes of both written and graphic disclosure, the turbine motor will be presented positioned in the horizontal plane, with the front and rear thereof being at the same general elevation as shown in FIG. 1 with its rotor 12 turning about a central vertical axis referred to herein as the rotor shaft 14, having a central axis of rotation. The descriptive analysis to follow is based upon the motor functioning in the form of an ambulatory unit affixed to a motive power machine for example, an automobile, being disposed in the horizontal plane and so as to receive oncoming air without obstruction.

The frontal surface of the shroud 10 is composed of a plurality of intake conduits. For purposes of illustration, FIG. 1 shows the motor having two intake conduits 16 and 17. These intake conduits 16 and 17 are positioned such that fluid flow enters and is, thus, collected thereby, then directed to selected areas within the shroud assembly.

The term fluid as used herein is intended to include a gas including air or any liquid medium or combinations thereof such as, for example, water vapor suspended in air. By way of example, the motor will be described hereinafter in connection with atmospheric wind or ram air or a combination as the fluid and will be generally referred to as "air". The invention, however, is in no way restricted to such fluid. Ram Air may be defined as atmospheric air existing at "0" velocity, through which a motive power machine travels at constant or variable speed, thus producing a mechanically created atmospheric air pressure upon its frontal surface related to velocity of the motive power machine. Atmospheric wind is defined as air movement created by unequal heating of the earth and atmosphere, having some characteristic flow patterns due to the earth's rotation.

The left intake conduit 16 as shown in FIG. 1 is arranged such that oncoming air is collected and directed to the rotor vanes 13 in position within a first quadrant, preferably on or about the left frontal quadrant of the rotor assembly, as shown in FIG. 1, moving in a direction from front to rear. The right intake conduit 17 collects oncoming air and directs it to an area to approximately balance the force being exerted on the vanes by the fluid collected from the left intake conduit. Generally, the right intake conduit 17 directs the fluid rearward to a second quadrant, preferably to or about the right rear quadrant of the rotor, as shown in FIG. 1 where it deflects the air direction. It is preferable that the air be directed as far to the rear of the rotor on the right side as shown in FIG. 1, to maximize the use of as many vanes on that side as possible for transference of kinetic wind/ram air produced force to the rotor assembly 11, while balancing that force with the air from the left intake conduit 16. The air is preferably deflected by greater than ninety degrees and more preferably, approximately between about one hundred seventy to about one hundred ninety degrees, having the air strike the rotor vanes 13 within this second quadrant from behind, with the resultant force being applied in the opposite direction against the rotor vanes as is applied to the vanes in the left frontal quadrant, the first quadrant. Air flow around the rotor is substantially passing forward on the right side and substantially rearward on the left side.

This delivery system therefore applies an air force to both sides of the rotor, in opposite directions, with approximately equalized vector forces, rather than having approximately one half of the rotor vanes positioned on the right side providing no energy to the rotor. In addition, the generally opposed relationship of the fluid as it impinges on the vanes balances the forces being applied to the vanes.

The length of the right intake conduit throat chamber 27 to the right rear allows air to be pressurized in even flow and renders a gentle, harmonious change of direction, around the right inner wall of the shroud 19, as desired to minimize turbulence and impedance that would otherwise be caused by an abrupt directional guidance change. The fluid exits the right intake conduit 17, at an opening 20, and expands into the inner portion of the shroud 10, creating a venturi effect which aids in pulling air through intake conduit 17. As shown in FIG. 1, in the preferred embodiment, the portion of the rotor vane assembly that has minimum or no air force projected upon it at any point in time is that circumferential length designated as ZONE 1 (21). It is significant that this area preferably be kept minimal as the venturi effect created by the exit of fluid from right conduit 17 can create a backwash, or counter vector force, opposed to the rotating direction of the rotor 12.

Both right and left intake conduits, 16 and 17 respectively, are to be placed in the direction to receive oncoming air by being positioned facing the direction in which the motive power machine is moving.

The left intake conduit 16 consists of four sides, right, left, upper, lower. The left conduit 16 is flared out at its frontal-most portion in order to increase its area of air collection. This can best be understood from observation of FIGS. 1 and 2. From its frontal-most point, the conduit decreases in its cross sectional surface area in a funnel-like design, causing the incoming air pressure and velocity to increase prior to said air subsequentially being expanded by a venturi effect into the interior of shroud 10 before it strikes the rotor vanes of the left frontal quadrant. The curvature (contour) of all four sides is such that any air turbulence due to severe resistance to flow is minimized.

A number of vertical directional guidance partitions 22 are located within the left conduit throat 23, to laminate the air flow as an aid in directing the incoming air to, in respect to conduit 16, cause the air flow to strike upon the most efficient surface area of each rotor vane 13 and to reduce turbulence. The most "efficient surface area" as used herein is its outermost portion, away from the rotor shaft 14.

After passing through the entire left side of the shroud around the rotor, the pressurized air is expelled through the rear exhaust conduit 24. Rear exhaust conduit 24 is in the form of a venturi and the venturi effect of air passing therethrough enhances the flow of air passing through the turbine motor.

The left intake conduit throat 23 is able to be closed off independently by means of a sliding louver assembly 25 located in the frontal shroud section 26, to the right of the throat 23 when not in use. One or more of the intake conduits may not be in use at any one time for a number of reasons including: if atmospheric wind/ram air conditions became so intense so as to cause excess rotation of the rotor above its optimum RPM level, with possible resultant damage to the entire system; or if use of the air turbine was not required. In accordance with the above, the size and shape of the louver assembly should be such that it is arranged to block off the air flow while being capable of storage in the frontal shroud section when not in use, as will be well understood by those with skill in the art. In FIG. 1, sliding louver assembly 25 is shown as a single curved panel which can be slid into position to block fluid flow through left intake conduit 16., The right intake conduit 17 is basically designed the same as the left intake conduit 16 in its most front facing portion, as shown in FIG. 1, so as to be able to collect a large cross section of oncoming air and having a progressively reduced cross section, rearward, culminating by a transition into a throat chamber 27, thus increasing air velocity and pressure, i.e. producing a venturi effect.

As previously stated, the right intake conduit 17 collects pressurized air for delivery to the rotor vanes 13 on the right side of the rotor 12, as shown in FIG. 1. In the preferred embodiment, this is accomplished in the shroud arrangement by a rearward extension of the throat 18 of the right intake conduit 17 along the entire right side of the rotor assembly 11, as shown in FIG. 1, and around the right inner shroud wall 19. After passing around the rotor area, the conduit throat 18 preferably makes a continuous constant radius curve of about one hundred eighty degrees to the left, resulting in a forward facing portion terminating with an opening 20 to allow the force of pressured air flow air pressure to be applied to the rotor vanes 13 as they pass opening 20.

The curved portion of the right intake conduit throat 18 lying within the right rear quadrant contains a plurality of vertical guidance partitions 28 to minimize air turbulence as the pressurized air changes direction and to further laminate the fluid flow. The opening 20 of the throat 18 to the rotor 12 is disposed so as to have the air strike the vertical vanes 13 upon the most efficient section of their surface area. The pressurized air next travels within the vanes of the rotor's right side, following the curvature of the inner shroud wall 19 around the rotor 12, being directed forward to the frontal right quadrant, then left into the frontal left quadrant, passes the throat opening of the left intake conduit, and proceeds to the rear through the moving vanes of the rotor's left side, being expelled through the rear exhaust conduit 24, all as seen in FIG. 1. A venturi effect is developed as the right rotor air passes the left air intake conduit throat opening 23, thus enhancing the pressure and velocity of the incoming air from the left intake conduit 16.

The right intake conduit throat 18 also contains a louver system 29 to close it off, if required for reasons previously stated. FIG. 1 shows the louver system 29 of the right intake conduit 17 as a horizontal sliding system comprising 2 straight panels.

The rear exhaust conduit 24 is located in the left rear quadrant of the motor shroud 10 and is the ultimate means of escape for the air that has been introduced through both left and right frontal intake conduits 16 and 17 respectively. The rear exhaust conduit 24 further increases the total efficiency of the fluid driven turbine motor as follows: The throat 31 of the exhaust conduit 24 is the area where pressurized air is expelled from the rotor vanes 13. The four walls of the exhaust conduit 24 are disposed to flare outwardly in right, left, upper and lower directions, thus creating a progressively larger cross-sectional area for air exhaust and thereby increasing the conduit's (24) volume to be filled by the expelling air. The outward flare of the exhaust conduit causes a Venturi effect at its rear border as related to passage of atmospheric air/wind over and around it. A partial vacuum is drawn on the shroud interior posterior to the rear border of the exhaust conduit 24 which encourages even a greater amount of air to pass through the motor shroud 10 to aid and enhance the flow of fluid therethrough.

Although not wishing to be bound by theory, it is believed that since the throat 31 has a lesser cross sectional surface area (lesser volumetric content) which makes a transition into the rear portion of the conduit having a greater volumetric content, air pressure has been decreased within the exhaust conduit at a single point in time, creating a tendency for the air being expelled to enter the exhaust conduit at greater velocity to constantly attempt to rectify the pressure gradient within the conduit. A chain reaction occurs to keep the throat area 31 portion of the shroud with an ample air exhaust supply in that incoming air must pass the rotor vanes at a faster rate per unit time to satisfy the constant pressure gradient within the exhaust conduit, thus increasing the RPM of the rotor assembly.

All of the aforementioned features of the exhaust conduit 24 are intended to increase the total efficiency of the turbine system by developing a maximal frontal air pressure and minimizing the posterior exiting air pressure and to equalize the air flow force on the rotor. To constantly satisfy this pressure gradient, the resultant effect should be a greater and more efficient effective air force applied to the rotor vanes resulting in increased rotor RPM per unit of applied energy.

In another embodiment, the left intake conduit 16 and the right intake conduit 17 may include, external to the directional guidance partitions 22, a heated grid assembly 32 which extends across the entire surface area of the conduits. This assembly serves at least three functions. The heated grid 32 prevents entrance of any airborne foreign body (birds, paper, stones, etc.) into the rotor assembly that would cause malfunction and damage. The heated grid assembly 32 prevents any frozen form of atmospheric moisture from entering the rotor assembly which could cause icing with resultant loss of efficiency and/or damage. In addition, the heated grid also helps to expand the fluid, thus increasing pressure and velocity. The rear exhaust conduit 24 may also include a heated grid assembly 32 and may be located near the conduit throat 31 posterior to the rotor assembly 11. The heated grids may be of any design and shape to accomplish the objectives disclosed above, which will not impede the overall function of the motor as disclosed herein.

The fluid driven motor is arranged to capture air flow force energy and to direct this energy and force to be exerted on multiple vertical vanes 13 of a circular rotor 12 in order to cause said rotor to revolve (as conversion to mechanical energy) around a central rotor shaft 14 to which the rotor 12 is affixed. Energy is transferred to the shaft 14 causing it to revolve in direct proportion to the revolutions of the rotor 12. Although not necessary for purposes of this invention, the measurement of revolutions per unit time is accomplished by the use of either an electric or mechanical tachometer (generally denoted as 33 in FIG. 2) which could be attached to either end of the shaft. If, for example, the rotor was to complete seven hundred revolutions per minute, the shaft would reflect the same number of revolutions.

Figure 5:
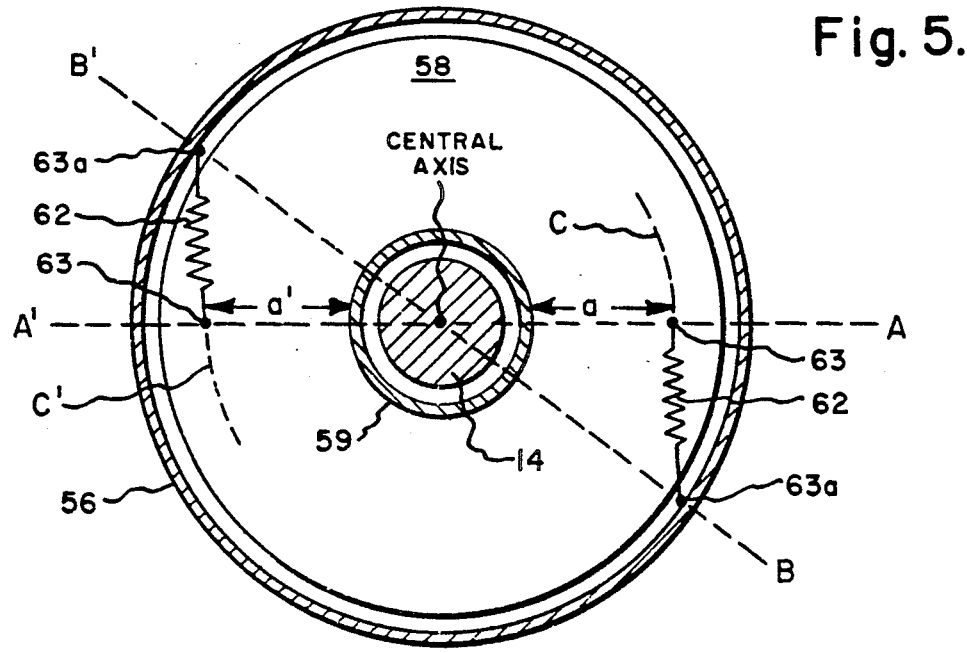
FIG. 5 is a plan sectional view of a centrifugal weight retractor spring assembly, as shown in FIG. 4.

The rotor shaft projects exteriorly, both above and below the shroud assembly 10, in order for the shaft 14 to be accessible as a power transference source for driving a form of an electrical generating device, for example, an alternator or D.C. generator. The design as illustrated in FIGS. 2 and 5 shows the longer projection of the shaft to be above the rotor assembly 11 and the upper shroud covering 34. It is the function of the rotor shaft 14 to transfer rotational mechanical energy of the rotor to an electrical generator by any known means including a pulley wheel, centrifugal clutch, etc. generally indicated as 35 in FIG. 2. Serving in this capacity, the rotor shaft would become the propeller or power takeoff shaft of the turbine system. The electrical generator assembly may be located in chamber 36, located above the upper shroud covering 34 and enclosed by cover 37. The rotor shaft projects below the base of the shroud assembly 38.

Three circular discs 39, 41 and 42, are affixed to the central shaft 14, by three ring mounts 43, 44 and 45. Multiple vertical vanes 13, not specifically shown in FIG. 2, are mounted between circular discs 41 and 42. The vanes are generally represented in FIG. 2 as 46. Each vane 13 is the surface to which the incoming air flow force is applied, thus, for example, converting wind energy to rotational mechanical energy. The rotor shaft 14 is maintained in position relative to the shroud assembly by any suitable means including two bearings, upper and lower 48 and 49 respectively and upper and lower mounting plates 51 and 52 respectively, and projects above and below the shroud to the extent required.

The rotor 12 extends between circular discs 41 and 42. It forms a circumferential wall internal to the rotor vanes, providing an inner facial surface between each vane to prevent pressurized air from passing inwardly beyond the vanes' innermost vertical edges. The combination of two adjacent vanes and the portion of the rotor between them forms a three sided air pressure chamber with top and bottom walls formed by portions of circular disks 41 and 42 respectively. The resultant pressure creates a force upon the rear vane causing it to move in the direction of the airflow. The frontal vane of the above described three sided chamber in turn becomes the rear vane of the next adjacent three sided pressure chamber to come in contact with incoming air.

The rotor 12 disposed in a plane, which is perpendicular to the longitudinal axis of rotor shaft 14, and is preferably disposed radially within a range of about $\frac{1}{3}$ to $\frac{2}{3}$, more preferably about $\frac{2}{3}$ of the radius of the circular discs 41 and 42. The volumetric content of the chamber thus formed by rotor 12 is identified as interior cavity 47 and the air contained therein does not function in any energy producing capacity. The interior cavity 47 described above contains three components, a portion of the rotor shaft 14 and two circular ring mounts 44 and 45 affixing the rotor 12 to the rotor shaft 14.

The lower shroud base 38 may optionally include ports 53 for draining moisture from the rotor assembly.

Figure 3:
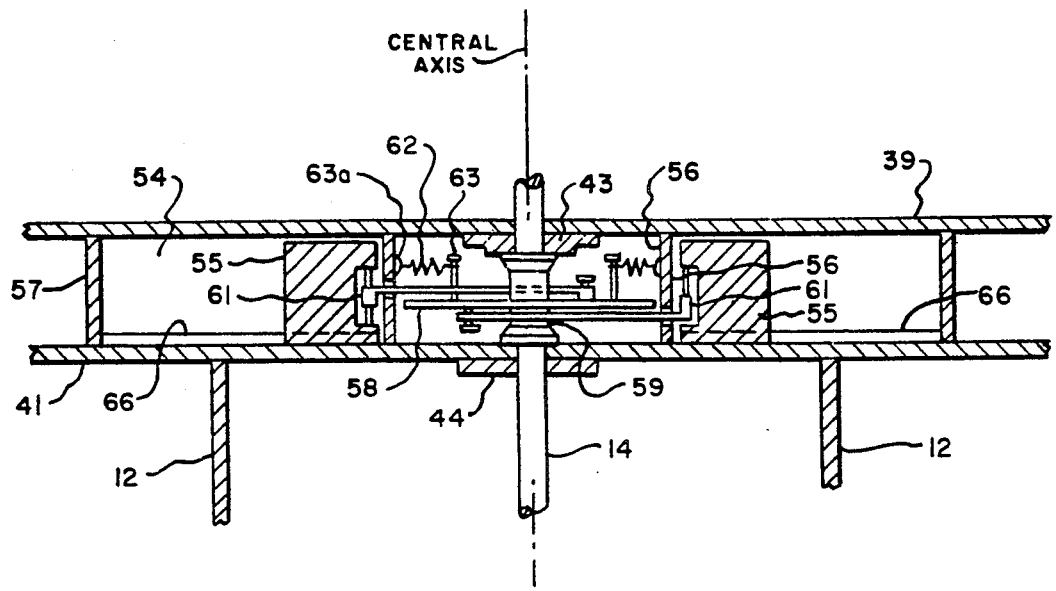
FIG. 3 is an enlarged cross sectional view of the retractable centrifugal weight assembly and rotor assembly on the line 2—2' of FIG. 1 and in the direction of the arrows.

In another embodiment, the motor may further comprise a retractable centrifugal weight assembly (RCWA). A centrifugal weight chamber 54, containing centrifugal weights 55 is located above circular disc 41 with circular disc 41 forming a bottom wall of weight chamber 54, the opposed wall of which is circular disc 39. Circular disc 39 is generally parallel to but spaced apart from circular disc 41 by inner stop collar 56 and outer stop collar 57. Weight chamber 54 is defined peripherally by an inner stop collar 56 and outer stop collar 57, which, with circular discs 39 and 41 comprise the walls of weight chamber 54. All components of this assembly rotate together in direct proportion to the rotor assembly 11. In addition, retractor disc 58 and sleeve component 59, shown in FIG. 3, which both rotate as a unit with the RCWA, are mounted to pivot about rotor shaft 14. The retractor disc 58 and sleeve 59 are made as a single unit and there is no separate movement of one in respect to the other. As the retractor disc 58 pivots, so does the sleeve 59, with sleeve 59 in a slip-fit relationship to rotor shaft 14, with rotor shaft 14 extending axially through sleeve 59.

A suitable number of centrifugal weights 55 should be utilized in accordance with this invention to maximize momentum and keep attained RPM constant through variations in air pressure prevailing on the vanes. For illustrative purposes the following description includes eight (8) in number. Four of the weights are connected to the retractor disc's 58 upper surface, while the other four are connected to the lower surface of the disc. The weights may be of any suitable material, shape and size to accomplish the objectives as herein described. The weights 55 move on guide rail assemblies 66. The guide rail assemblies allow the weights to move in a horizontal plane each in a straight radial line in respect to the axis of rotor shaft 14, traversing the distance between the inner and outer stop collars 56 and 57. Each guide rail assembly 66 includes two tracks 67 which are fixed to circular disc 41. The weights may be mounted on the tracks by any means known to those skilled in the art in accordance with the above.

Connecting rod assembly 61 attaches the weight to the upper or lower surfaces of the retractor disc 58. There are openings around the inner stop collar 56 for parts of the connecting rod assembly 61 to pass through. The connecting rod assemblies are attached by wrist pin assemblies 64 and 65, shown on FIG. 4.

Two retractor disc springs 62 may be used. Each spring has one end attached to the inner surface of the inner stop collar 56 at a point 63a, with the other end being attached to the retractor disc 58 by attachment means, e.g. a vertical pin 63 extending from the upper surface of the retractor disc 58, at a level which is spaced apart from the attachment points of the centrifugal weights 55 that are on the same surface. Both retractor springs 62 must be of equal length and weight, and be equivalent in linear tension. They must be attached within the assembly so as to maintain proper balance of the system during rotation. Therefore, in the preferred embodiment, they are attached to the retractor disc on opposite sides (FIG. 5) along a prescribed arc (C—C'; preferably 180 apart) and along a projected diameter line (A—A') of the retractor disc, said line passing through the axis of the rotor shaft 14, and being affixed at equal distances (a and a') from the central axis along that diameter line.

The same is true of the attachment points to the inner stop collar. This is along a second projected diameter line (B—B') of the retractor disc, passing through the axis of the rotor shaft 14, with each attachment being equidistant from the centerpoint. (The same concept applies to all the points of attachment of the centrifugal weight connecting rods.)

The springs, as mounted, may be under a prescribed amount of tension (one approximately equal to the other) when the rotor assembly is at rest, and be in such position so as to apply a tangential force upon the retractor disc when at rest.

The rotor shaft 14 extends through the retractor disc sleeve 59, with sleeve 59 substantially extending between circular discs 41 and ring mount 43. Sleeve 59 is not affixed to the rotor shaft 14, but is slip-fitted over rotor shaft 14 to be pivotally mounted thereto.

The retractor disc 58 rotates with the rotor assembly 11 in the same direction in direct proportion at high RPM and at any level of constant RPM from high down to rest. This is due to the connections of points 63a by springs 62. In addition to the described rotation, retractor disc 58 and sleeve 59 pivot separately from the rotation of rotor assembly 11 in an arc of approximately 90°, according to the degree of centrifugal force applied to centrifugal weights 55, such force being varied by increases or decreases in the RPM of the rotor assembly 11.

The following is one example, describing the operation of the RCWA by comparing relative functions, position changes, etc. through a complete movement system cycle of the rotor assembly 11 which is as follows: rotor 12 at rest; rotor 12 at low RPM; rotor 12 at medium RPM; rotor 12 at high RPM; rotor 12 from high to medium RPM; rotor 12 from medium to low RPM; rotor 12 from low RPM to rest position.

a. Rotor at Rest—All components are static with no movement. Centrifugal weights 55 are in their most retracted position, relative to the rotor shaft 14, resting against the exterior surface of the inner stop collar 56. Retractor disc 58 is in the rest position with equal static rest tension existing on the two retractor springs 62.

b. Rotor at Low RPM—Basically there is very little or no change from above regarding relative component position changes, except for proportional rotation of all systems, the assumption is that centrifugal force is not strong enough to have acted upon the weights to a sufficient degree to substantially overcome the static pressure applied by retractor springs 62.

c. Rotor at Medium RPM—Centrifugal upon the centrifugal weights causing them to move outward away from the inner stop collar along their respective guide rail assemblies by overcoming the tension of retractor springs 62. This movement causes repositioning of other RCWA components. Outward force placed on connecting rods leads to a counterclockwise outward movement. The force of the connecting rods causes retractor disc to pivot slightly in a counterclockwise direction, with increased tension being placed upon retractor springs.

d. Rotor at High RPM—Centrifugal weights 55 are out at their maximum distance away from the rotor shaft 14, resting against the inner surface of the outer stop collar 57.

Connecting rods are fully extended outward, being approximately radially disposed along their long axis, in relation to the axis of rotor shaft 14.

The retractor disc 58 has now been pivoted by approximately 90° in a counterclockwise direction with a resultant maximum tension existing upon the retractor springs which are fully extended to the extent possible in relation to the operation of the RCWA.

e. Rotor from High to Medium RPM—Centrifugal weights 55 begin to move inward due to tension from the retractor springs 62, to a point where the weights 55 become static for that particular RPM level (the centrifugal force equals the opposite force of the retractor springs 62).

Retractor disc 58 has rotated in a clockwise direction to a static point relative to the RPM level.

Connecting rods move inward in a clockwise direction.

f. Rotor from Medium to Low RPM—All components continue to change position as described above to almost approach final rest position.

g. Rotor from Low RPM to Rest—Centrifugal force approaches 0, centrifugal weights 55 come to rest against inner stop collar 56, retractor disc 58 returns to rest position (determined by connecting rod rest positions) with original rest position tension existing on retractor springs 62.

Figure 4:
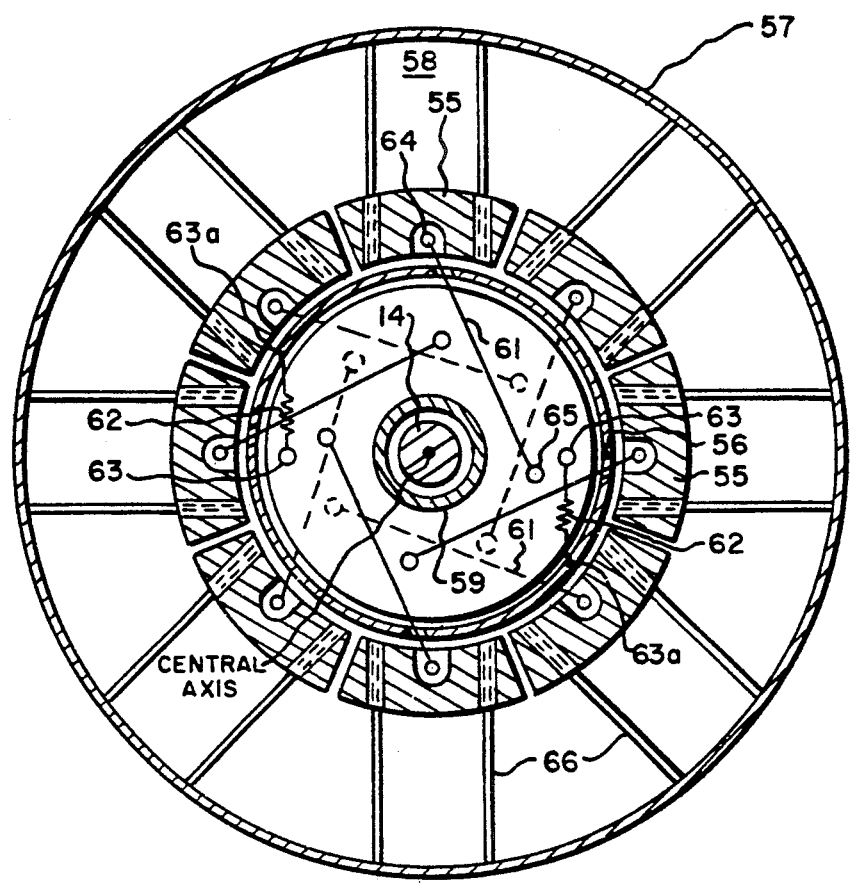
FIG. 4 is a plan sectional view of the retractable centrifugal weight assembly, as shown in FIG. 3.

Each centrifugal weight 55 has its own guide rail assembly 66, consisting of two substantially parallel tracks 67 (FIG. 4). They equal a length which is determined by the distance between the inner 56 and outer 57 stop collars. A centered line between the two tracks passes through the axis of rotation of rotor shaft 14. Each assembly has an opposite assembly at an arc distance of 180°. There are a total of eight track assemblies. The tracks ensure proper outward directional movement and maintain an equal peripheral balance during rotation. They also ensure the ability of the RCWA to function in all planes from horizontal to vertical, and even upside-down.

As mentioned before, the two retractor springs 62 have been integrated into the RCWA so as to apply an equal counter force to each of the eight centrifugal weights.

The function of the centrifugal weight system is to provide additional peripheral weight along the outer edge of the rotor assembly in order to enhance momentum during rotation by creating a flywheel inertia effect. The RPM of the rotor in its optimum range will have less variance with periodic changes in air pressure and will tend to suffer less reduction in RPM during momentary periods of decreased air pressure, due either to changes in atmospheric air conditions, such as wind shifts or gusts. In addition, the slow down in RPM will be smoother during the slowing down of the motive power machine.

At an optimum RPM, the centrifugal weights are at their outermost peripheral position, and are brought to that point and maintained there by the centrifugal force developed by the rotation of the rotor assembly.

At the same time, when there exists a reduced RPM, the centrifugal weight assembly retracts, pulling the movable weights inward toward the center of rotation of the turbine. When the rotor is at rest, the centrifugal weights are in their most retracted position, away from the periphery of the rotor. This ability to retract increases the ease in causing the rotor to begin to turn from a stopped position (requiring less air pressure force), rather than having a fixed peripheral weight system, requiring more energy input to overcome static inertia in order to begin rotor movement.

The forms of electrical energy produced may be either alternating or direct current. The electrical energy may be used in several modalities as follow: used directly as produced in order to operate either a direct or alternating current electric motor or some other electrical appliances; produced as direct current for the purpose of charging storage batteries, reserving use of the electrical energy at a future time as needed; produced as alternating current and converted to direct current via rectifier in order to charge storage batteries.

The motor may be affixed to a Motive Power Machine (a form of self propelled conveyance), either as a self contained portable unit or as an intrinsic design component to said conveyance. Examples of such conveyances are, but not limited to, the following; Automobile, Bus, Truck, Railroad or Marine conveyances, Aircraft, or any such non motive device that the aforementioned ambulatory motive conveyances are capable of moving (trailers, railroad cars, barges, etc.).

Other applications for use of the motor are, but not limited to, the following: Use on an electrically powered motive power machine (electric auto or truck) in order to provide replacement of spent electrical energy, such energy being derived from the forces of ram air and atmospheric wind, created in part by the movement of the motive power machine through atmospheric air, (such application of use with an electrically powered vehicle would greatly increase the range of its traveling distance before it became necessary to recharge its batteries to their optimum capacity from a conventional electrical source); used as a power source for ambulatory electric refrigeration units, being affixed to either a highway vehicle (truck) or railroad refrigerated freight car; reverse use for an electrically powered heating unit on a highway or rail conveyance; and use on a marine vessel to produce electricity for a variety of purposes.

The motor may be used as a portable unit that can be attached and removed from any form of motive power machine without impeding solo operation of said machine; and/or as an integral design component of a motive power machine; or developed as a stationary self contained unit, not used with any form of motive power, and utilizing only atmospheric wind as its energy source. Where the motor is attached to a motive power machine, any means known to those skilled in the art may be utilized which would not interfere with the operation of the motor or the motive power machine, as disclosed herein.

Other embodiments of the invention will be apparent to those skilled in the art from a consideration of this specification or practice of the invention disclosed herein. It is intended that the specification and examples be considered as exemplary only with the true scope and spirit of the invention being indicated by the following claims.

What is claimed is:

1. A fluid driven turbine motor comprising:
   a) a turbine shroud;
   b) a rotor assembly attached to a central portion within said turbine shroud; said rotor assembly comprising a rotor and a plurality of vertical vanes; said vanes being mounted to said rotor and extending radially outward therefrom;
   c) a plurality of flared intake ports, primarily located in front of the shroud, directing a fluid flow to said vanes; said intake ports being positioned such that fluid flow is directed in opposite directions on opposite sides of the rotor to thereby exert balanced forces onto said vanes, and d) a retractable, centrifugal weight assembly, which comprises (1) a plurality of centrifugal weights, said weights being arranged in a predetermined manner to maximize momentum and maintain attained RPM, and (2) a guide rail assembly for each centrifugal weight, said guide rail assembly comprising two substantially parallel tracks having a predetermined length and extending radially outward from a center, said center being substantially aligned vertically with a center of said rotor assembly; said centrifugal weights being mounted to said tracks by means which allow said centrifugal weights to traverse the length of said tracks.

2. The motor as recited in claim 1 having two intake ports along a front portion of said motor where said fluid flow enters said motor.

3. The motor as recited in claim 1 further comprising an exhaust conduit from which said fluid flow exits said motor.

4. The motor as recited in claim 3 wherein said exhaust conduit is near a rear portion of said motor.

5. The motor as recited in claim 3 wherein said exhaust conduit is flared.

6. The motor as recited in claim 5 further comprising a heated grid assembly, said heated grid assembly extending across a surface area of said exhaust conduit where said fluid flow exits said conduit.

7. The motor as recited in claim 1 wherein said intake ports are flared.

8. The motor as recited in claim 7 further comprising a plurality of guidance partitions located within said intake ports.

9. The motor as recited in claim 7 further comprising heated grid assemblies, said heated grid assemblies extending across a frontal surface area of said intake ports where said fluid flow enters said ports.

* * * * *